UNITED STATES PATENT OFFICE.

L. L. SLOSS, OF NEAR SOUTH UNION, KENTUCKY.

IMPROVEMENT IN DOUBLE-SHOVEL PLOWS.

Specification forming part of Letters Patent No. 68,247, dated August 27, 1867.

*To all whom it may concern:*

Be it known that I, L. L. SLOSS, of near South Union, in the county of Logan and State of Kentucky, have invented a new and useful Improvement in Double-Shovel and other Plows; and I do hereby declare that the following is a full, clear, and exact description thereof, which will enable others skilled in the art to make and use the same, reference being had to the accompanying drawings, forming part of this specification, in which—

Figure 1 is a top view of two double-shovel plows illustrating my improvement. Fig. 2 is a detail sectional view of the same, taken through the line $x\,x$, Fig. 1.

Similar letters of reference indicate like parts.

My invention has for its object to furnish an improved means, simple, durable, and effective, for connecting or coupling shovel or other plows together, for convenience in seeding small grain, and in cultivating corn, cotton, &c.; and it consists in the three adjustable connecting-bars, not in the same horizontal plane, and pivoted or connected at each end to the plow-frames, so as to have a lateral and a vertical motion, as hereinafter more fully described.

A are the plow-beams, and B are the standards, to which the shovels C are attached in the ordinary manner.

D E F are the connecting or coupling bars, the ends of which pass through the forks of the forked heads of the swivel-bolts G, to which they are secured by pins or bolts passing through them, and through one or the other of the holes through the ends of the said bars D E F, according to the distance apart at which it is desired to have the plows work.

The swivel-bolts G are secured to their supports by washers and nuts, or by keys, as may be desired.

The two forward bars D and E are connected directly to the beams A of the plows, and the rear bar to the upwardly-projecting ends of the rear standards B, or to some other support projecting above the said beams.

By this construction, or by connecting the said bars to the said frames by double-jointed hinges, the two plows have a lateral movement or side play, which enables the operator to guide them as may be necessary, and the vertical movement prevents any undue strain from coming upon the bars D E F should one of the plows be drawn in advance of the other.

The precise manner in which the bars D E F are pivoted or connected to the plow-frames is immaterial, so long as they have the lateral and vertical movements hereinbefore described.

I claim as new and desire to secure by Letters Patent—

Connecting the plow-frames to each other by the three adjustable bars D E F, not in the same horizontal plane, and pivoted or connected at each end to the said plow-frames by double-jointed hinges, or equivalent connections, so as to have both a lateral and vertical movement, substantially as herein shown and described, and for the purpose set forth.

L. L. SLOSS.

Witnesses:
   JNO. W. MALONE,
   M. B. MORTON, Jr.

J. R. SMITH.
Ore Washer.
No. 68,248.
Patented Aug. 27, 1867.
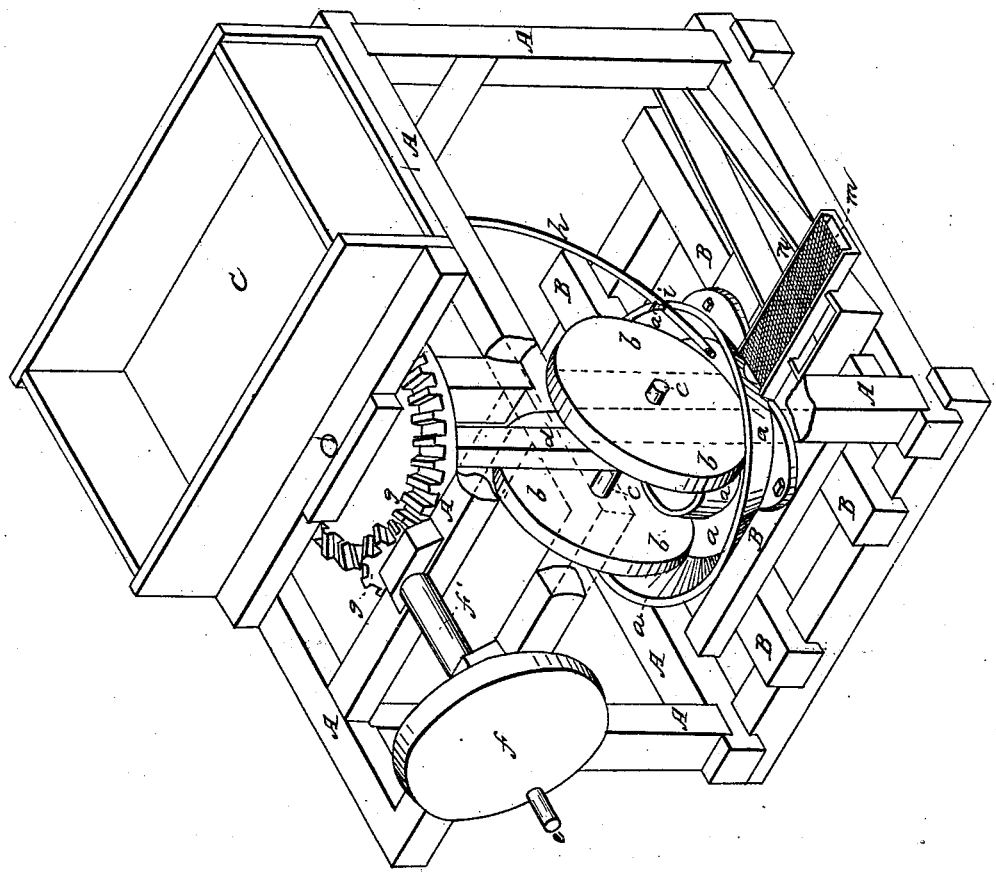
WITNESSES:
INVENTOR:
John R. Smith
by his attorneys
Bakewell & Christy